United States Patent [19]

Mathellier

[11] Patent Number: 4,959,081

[45] Date of Patent: Sep. 25, 1990

[54] SEALING AND TRIMMING

[75] Inventor: Lionel Mathellier, Chartres, France

[73] Assignee: Draftex Industries Limited, Edinburgh, Scotland

[21] Appl. No.: 388,987

[22] Filed: Aug. 2, 1989

[30] Foreign Application Priority Data

Aug. 9, 1988 [GB] United Kingdom ................. 8818887

[51] Int. Cl.⁵ ............................................. E06B 7/16
[52] U.S. Cl. ...................................... 49/490; 49/491; 49/497; 52/716
[58] Field of Search ................. 49/491, 497, 490, 496, 49/462; 52/716; 428/122

[56] References Cited

U.S. PATENT DOCUMENTS

| | | | |
|---|---|---|---|
| 2,699,581 | 1/1955 | Schlegel | 49/491 |
| 4,105,814 | 8/1978 | Eggert | 52/716 X |
| 4,114,320 | 9/1978 | Pullan | 49/491 |
| 4,424,976 | 1/1984 | Hayashi | 49/491 X |
| 4,432,166 | 2/1984 | Weimar | 49/491 |
| 4,542,610 | 9/1985 | Weimar | 49/491 |
| 4,610,907 | 9/1986 | Elvira | 49/491 X |

FOREIGN PATENT DOCUMENTS 816177 7/1959 United Kingdom ................. 49/491
830748 3/1960 United Kingdom ................. 49/491

Primary Examiner—Philip C. Kannan
Attorney, Agent, or Firm—Leydig, Voit & Mayer

[57] ABSTRACT

A sealing strip for mounting on a flange, such as surrounding a closable opening in a vehicle body, has a channel-shaped gripping part supporting a softer sealing part against which the closure member for the opening sealingly closes. The gripping part comprises a metal carrier embedded in extruded rubber or plastics material. Where the flange is relatively thick, the gripping part is pre-formed with its channel sides substantially parallel to each other so as firmly to grip the flange. However, where the flange is thinner, one side of the gripping part is moved closer to the other side and the gripping part thus still firmly grips the flange. During manufacture, the gripping part is passed through apparatus which is pre-programmed to adjust the width of the gripping part along the length of the sealing strip, the different configurations being automatically positioned along the length of the sealing strip in correspondence with the known changes in thickness of the flange.

9 Claims, 4 Drawing Sheets

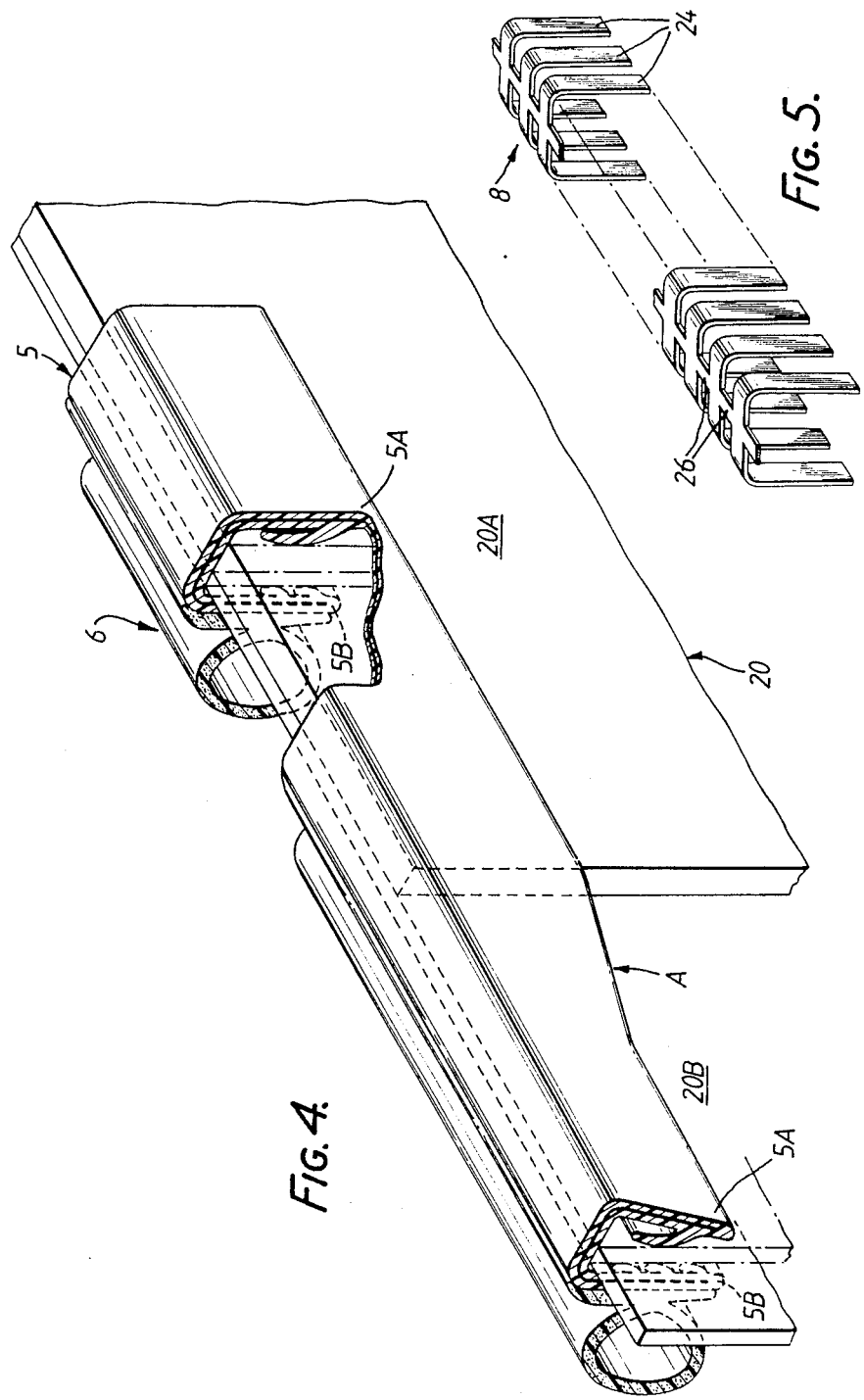

SEALING AND TRIMMING

BACKGROUND OF THE INVENTION

The invention relates to sealing or trimming strips particularly, though not exclusively, for use on motor vehicle bodies such as for sealing around door and other closable openings thereon and/or for trimming flanges therearound.

SUMMARY OF THE INVENTION

According to the invention, there is provided a channel-shaped strip for embracingly gripping a support member of known variable thickness, the width of the channel being varied along the length of the strip in a predetermined manner so as to match the known variation in thickness of the support member.

According to the invention, there is further provided a sealing strip for mounting on a flange running around a closable opening on a motor vehicle body, the flange having a predetermined variation in thickness around the periphery of the opening, the sealing strip comprising a channel-shaped gripping part for embracingly gripping the flange and a resiliently soft sealing part mounted externally on the gripping part so as to be supported thereby around the periphery of the opening so as to be sealingly contacted by the closure member for the opening, the width of the channel of the gripping part varying along the length of the sealing strip in such predetermined manner as to match the predetermined variation in thickness of the flange.

According to the invention, there is also provided a method of manufacturing a sealing or trimming strip of channel-shaped form for embracingly gripping and mounting on a flange or similar support member whose thickness varies in a predetermined manner along the length thereof, comprising the steps of varying the width of the channel along the length of the strip in a manner which is predetermined and corresponds to the predetermined variation of the thickness of the flange or other support member.

According to the invention, there is still further provided apparatus for use in manufacturing a channel-shaped strip for embracingly gripping a flange which runs around a closable opening on a motor vehicle body and which has a predetermined variation in thickness along the length of the flange, comprising strip moving means and width-varying means which are movable relatively to each other in a path running in the longitudinal direction of the strip, and means for automatically adjusting the width-varying means, in dependence on the predetermined variation of flange thickness, whereby to vary the width of the channel along the length of the strip in such manner that the width of the channel, along the length of the strip, substantially matches the predetermined variation of flange thickness.

DESCRIPTION OF DRAWINGS

Sealing strips embodying the invention for sealing around openings in motor vehicle bodies, and methods according to the invention of mounting sealing strips around such openings, will now be described, by way of example only, with reference to the accompanying diagrammatic drawings in which:

FIG. 4 is a diagrammatic part cut-away view of the sealing strip mounted on a flange of varying thickness;

FIG. 5 is a perspective view of a metal carrier used in the sealing strip;

DESCRIPTION OF PREFERRED EMBODIMENTS

Figure 1:
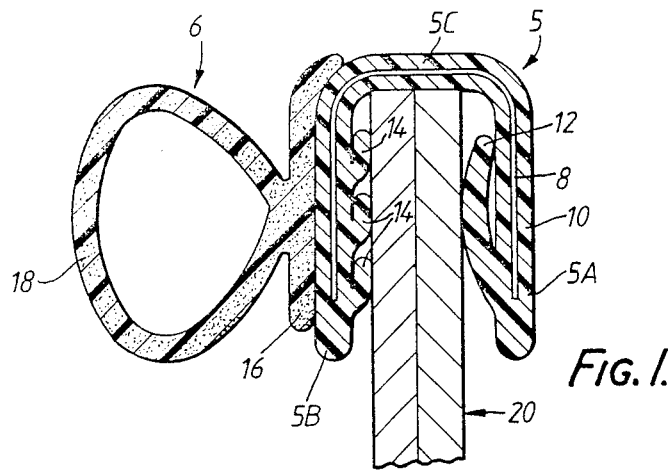
FIG. 1 is a diagrammatic cross-section through one of the sealing strips mounted on a supporting bodywork flange.

As shown in FIG. 1, the sealing strip comprises a channel-shaped gripping part 5 and a tubular sealing part 6. The gripping part 5 comprises a channel-shaped carrier 8, normally made of metal, which extends along the full length of the strip. The carrier 8 may take any suitable form but examples are described later. It is embedded in extruded plastics or rubber material 10, such as by passing it through a cross-head extruder. The extruded material 10 is extruded to form integral gripping lips 12 and 14, in this example there being a large lip 12 and three smaller lips 14. However, other shapes and numbers of gripping lips can be used instead.

The sealing part 6 comprises a base 16 carrying a closed tube 18. The sealing part 6 is preferably made of extruded rubber material, such as of cellular or foamed consistency. It is secured to the gripping part 5 by being adhesively attached on one outside side wall of the channel.

It is also possible for the extruded material 10 to be extruded so as integrally to include the sealing part 6; for example, if the extruded material 10 is rubber, then it and the rubber material of the sealing part 6 can be extruded integrally together but with different hardnesses so that the material 10 is of solid consistency and relatively hard whereas the extruded material of the sealing part 6 is softer and of cellular or foamed consistency.

The extruded material 10 may be extruded so that the material forming the lips 12,14 is softer than the channel-shaped extruded material.

In use, the seal is mounted on the vehicle body by being placed over the bodywork flange 20 surrounding the opening to be sealed. The gripping part 5 embraces the flange so that the lips 12 and 14 bear resiliently against its opposite sides. This and the resilience of the metal carrier 8 secure the gripping part 5 firmly in position. In this way, the sealing part 6 is mounted around the periphery of the opening and in such position that the closure member of the opening closes onto the sealing part 6 and partially compresses it, thereby making a weatherproof seal around the opening. The closure member may, for example, be a vehicle door or the lid of the luggage boot or engine compartment opening on the vehicle.

The bodywork flange 20 is produced by the coming together of the edges of bodywork panels at the periphery of the opening. Such bodywork panels may be secured together by spot-welding at intervals along the length of the flange. The number of bodywork panels which come together to form a flange will vary, and in fact is likely to vary around the periphery of the opening. For example, in some positions along the periphery, there will be two bodywork panels joined together to form the flange. At other positions, there may be three or even four panels, while elsewhere there might only be one such panel.

FIG. 1 shows a reasonably thick flange 20, its thickness being such that the gripping part 5 is a relatively tight fit on the flange and this secures the seal firmly on the flange and supports the sealing part 6 at the correct orientation with respect to the flange.

Figure 2:
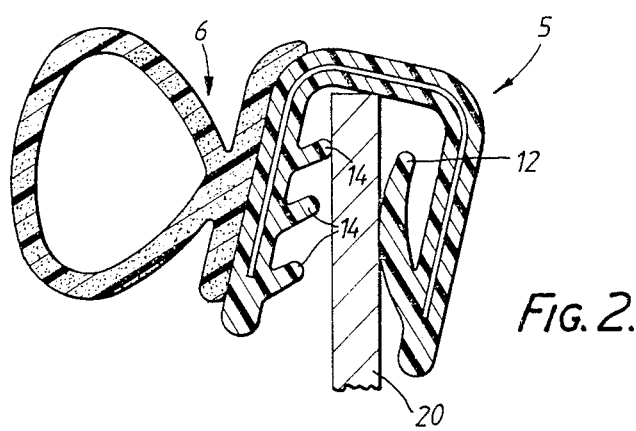
FIG. 2 corresponds to FIG. 1 but shows the sealing strip of FIG. 1 fitted onto a thinner flange.

However, if the sealing strip in the configuration shown in FIG. 1 is placed over a thinner flange 20, as shown in FIG. 2, it is apparent that the gripping part 5 will grip the flange in a very unsatisfactory manner—and will in fact hardly grip the flange at all. The result of this is that the strip can readily tilt on the flange, as is illustrated in FIG. 2. The sealing part 6 will thus be at the incorrect orientation with respect to the periphery of the opening and will not meet the closure member of the opening at the correct angle or in the correct position. There would thus be unsatisfactory sealing. In certain cases, the result could be that the closure member would force the gripping part off or partially off the flange.

Figure 3:
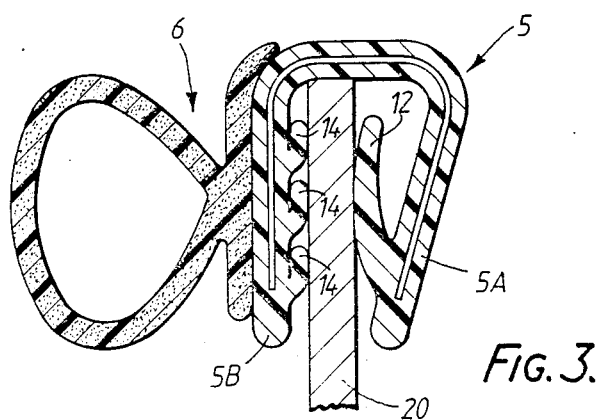
FIG. 3 corresponds to FIG. 2 but shows how the sealing strip is modified to fit satisfactorily onto the flange shown in FIG. 2.

In order to deal with this problem, therefore, the configuration of the gripping part 5 of the sealing strip is modified to the form shown in FIG. 3 at those positions along the periphery of the opening where the flange 20 is thin. As shown, the side wall 5A of the gripping part is bent inwardly, towards the side 5B, so as effectively to reduce the gap between the two sides. The result is that the gripping part 5 now once again firmly grips the flange 20. The relatively large lip 12, pressing on the side of the flange over a relatively large surface area, gives firm grip and a steadying effect and ensures that the smaller lips 14 are substantially flattened between the side 5B and the corresponding face of the flange 20. There is thus multi-point support for the gripping part 5 on the flange and it is thereby held in the correct, non-tilted attitude. The sealing part 6 is thus supported in the correct orientation.

In the manner to be explained, the sealing strip is formed, during the manufacturing process, so as to have the configuration shown in FIG. 1 at those positions where the flange 20 is relatively thick and to have the configuration shown in FIG. 3 at those positions where the flange 20 is relatively thin. The sealing strip is passed through apparatus which is programmed in accordance with the known thickness-profile of the flange around the vehicle opening so that the different configurations of the gripping part 5 (according to FIG. 1 or according to FIG. 3) are correctly positioned along the length of the strip. Therefore, when the strip is fitted in position on the vehicle body, during construction of the vehicle, the configuration of the gripping part 5 along the length of the strip will correctly match the thickness of the flange. This is illustrated in FIG. 4.

In FIG. 4, the flange 20 is shown to have a region 20A where it is relatively thick (corresponding to FIG. 1), being made up of two body panels coming together. At a region 20B, however, there is only one body panel making up the flange and it is relatively thin corresponding to FIGS. 2 and 3. Also clearly shown in FIG. 4 is the varying thickness of the gripping part 5, varying from the configuration shown in FIG. 1 where it grips the flange region 20A to the configuration shown in FIG. 3 where it grips the flange region 20B. At a region A, it will be apparent that the configuration of the gripping part is progressively changing from that corresponding to FIG. 1 to that corresponding to FIG. 3.

FIG. 5 shows, by way of example, one possible configuration for the metal carrier 8 of the sealing strip. As shown, it comprises a number of inverted U-shaped metal elements 24 which are integrally connected together by short connecting links 26 arranged along the inverted bases of the U's.

Figure 6:
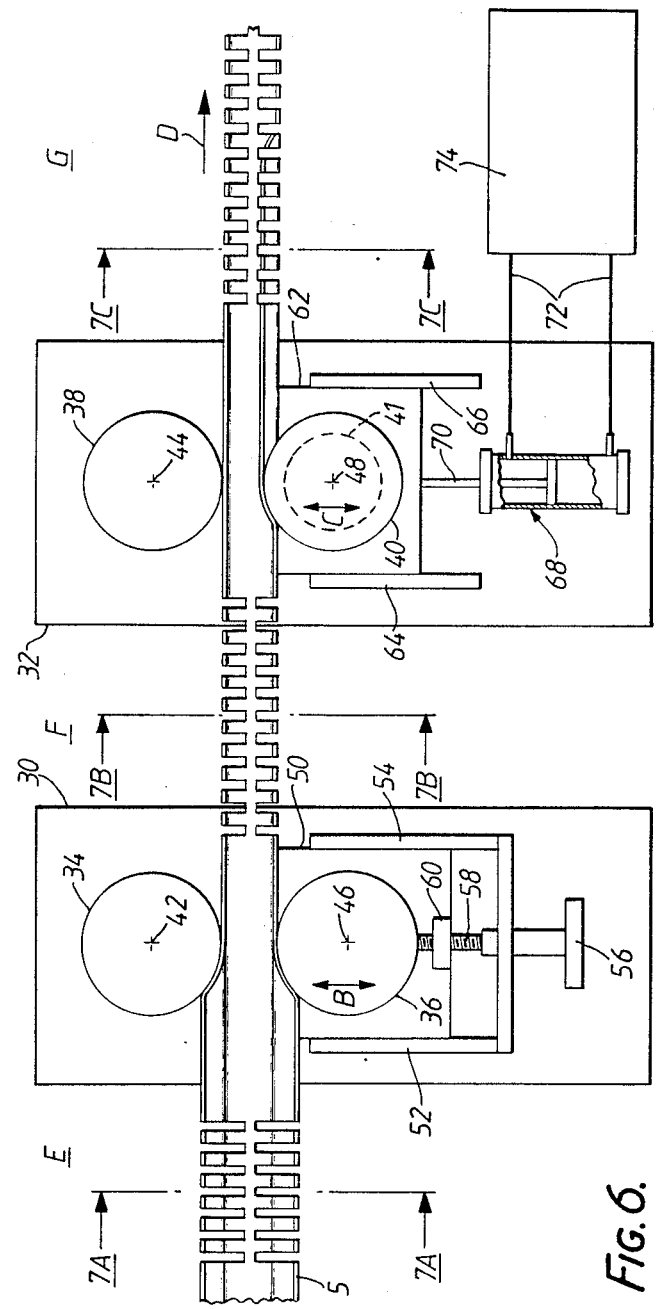
FIG. 6 is a diagrammatic plan view of apparatus used in the manufacture of the sealing strip.

FIG. 6 illustrates a plan view of apparatus used in the manufacture of the sealing strip. The apparatus comprises two platforms 30 and 32, supporting respective pairs of rollers 34, 36 and 38, 40. Rollers 34 and 38 are rotatable about fixed axes 42 and 44. Rollers 36 and 40 are rotatable about axes 46 and 48 respectively, but these axes are movable to and fro in the directions of the arrows B and C respectively.

Axis 46 is formed by a suitable rotatable axle which is mounted in a support 50 slidable within guides 52, 54, the position of the support 50 within the guides being adjustable (in the direction of the arrows B) by means of a wheel 56 which rotates a screw-threaded rod 58 engaging a block 60. In this way, therefore, the position of the roller 36 in relation to the position of the roller 34 can be controlled manually by an operator.

Axis 48 is formed by a suitable rotatable axle which is mounted in a support 62 slidable in guides 64 and 66 (corresponding to the guides 52 and 54). The position of the support 62 within the guides 64 and 66 is controlled by a piston-cylinder arrangement illustrated diagrammatically at 68 and operating pneumatically or hydraulically for example. The piston-cylinder assembly 68 controls the position of a piston rod 70 which is connected to the support 62. Therefore, the position of the support 62 can be varied, in the directions of the arrows C, by the appropriate admission of fluid into the cylinder (on either side of the piston) via pipes 72. The admission of fluid into these pipes is controlled automatically by a control unit 74.

Therefore, the relative positioning of the rollers 38 and 40 can be controlled automatically.

Figure 7A:
FIG. 7A, 7B and 7C are diagrammatic cross-sections on the lines 7A—7A, 7B—7B and 7C—7C, respectively, of FIG. 6, for explaining the operation of the apparatus of FIG. 6.

FIG. 6 also illustrates, diagrammatically, the gripping part 5 passing through the apparatus, in the direction of the arrow D. The view of the gripping part 5 is taken looking down into the interior of the channel (that is, inverted with respect to the orientations of the gripping parts in FIGS. 1 to 3). For ease of illustration, the extruded covering 10 of the gripping part is broken away at positions E, F and G, the metal carrier 8 (of the form shown in FIG. 5) thus being visible.

Where the gripping part 5 enters the apparatus of FIG. 6 (being driven through in any suitable way as by means of rollers), it has the configuration illustrated in FIG. 7A. As is shown here, the side walls of the metal carrier 8 are splayed outwardly—so as to be wider apart, at the entrance to the channel, than shown in FIG. 1. Obviously, the metal carrier 8, at the position where the section shown in FIG. 7A is taken, is actually covered with the extruded material 10 (see FIG. 1) and does not comprise the metal carrier alone.

Figure 7B:
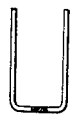
Figure 7C:

The strip in this form reaches the rollers 34 and 36 and passes between them. The position of the roller 36 is pre-set, using the handwheel 56, so that the positioning between the rollers is of the correct value to produce the configuration for the gripping part shown in FIG. 1. This is illustrated in FIG. 7B which shows the sides of the carrier 8 as being parallel to each other.

The sealing strip now passes between the rollers 38 and 40. The positioning between these rollers is controlled in the manner already described by the control unit 74. The control unit 74 operates according to a predetermined program and in dependence on the variation of flange thickness around the opening on the vehicle for which the sealing strip is intended. Therefore, the rollers 38 and 40 may be spaced apart with spacing corresponding to that between the rollers 34 and 36. In such a case, the gripping part 5 would pass between the rollers 38 and 40 without modification of its width. However, where the gripping part has to be adjusted to suit a thin flange 20 (corresponding to that shown in FIG. 3), the control unit 74 automatically moves the axis 48 closer to the axis 44 and roller 40 assumes the position shown in FIG. 6. In this position, the gap between the rollers 38 and 40 is reduced. During this process, the stepped part 41 of the roller 40 engages the base of the channel, the profile of the roller being shaped to bend the side 5B to the form shown in FIG. 3.

Although the finished strip has been described as having two possible configurations along its length, corresponding respectively to those shown in FIGS. 1 and 3, other configurations can also be used. Thus, by appropriate control of the piston-cylinder unit 68 of FIG. 6, the positioning between the rollers 38 and 40 can be adjusted so as to vary the positioning between the sides 5A and 5B of the gripping part to suit variations of the flange. For example, the configuration of the gripping part 5 shown in FIG. 1 could be such as to suit a flange whose thickness corresponded to three body panels. Rollers 38 and 40 could then be adjusted so as to alter the configuration to suit a flange thickness corresponding to two body panels. Such a configuration would bend the sides 5A and 5B towards each other to the correct extent. The rollers 38 and 40 could then be moved closer together so as to reduce the gap between the sides 5A and 5B still further, so as to be correct for a flange made up of one body panel only.

Figure 8:
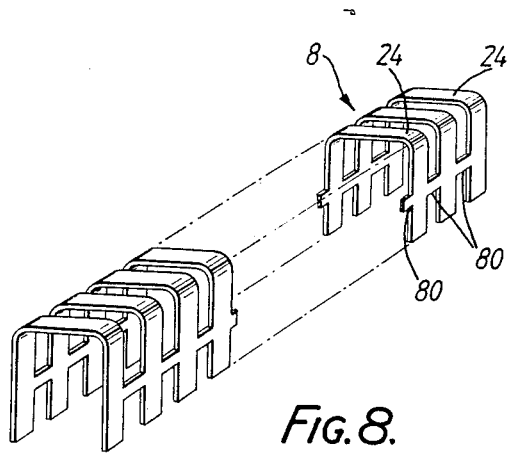
FIG. 8 is a perspective view of a modified form of metal carrier for use in the sealing strip.

It is not of course necessary for the carrier to have the configuration shown in FIG. 5. It may, for example, have the configuration shown in FIG. 8 where the U-shaped elements 24 are connected together by connecting links so arranged between the legs of the elements. However, other configurations can be used instead, such as incorporating looped wire.

What is claimed is:

1. A channel-shaped strip for embracingly gripping a support member of known variable thickness, the channel of the strip having, prior to fitment to the support member, a width which varies along the length of the strip in a predetermined manner so as to match the known variation in thickness of the support member.

2. A strip according to claim 1, in the form of a gripping part which externally supports a soft resilient sealing part.

3. A strip according to claim 1, in which the strip comprises a channel-shaped resilient carrier embedded within plastics or rubber material.

4. A strip according to claim 3, in which the plastics or rubber material supports at least one gripping lip which runs longitudinally along the length of the strip within the channel and is mounted on one of the facing side walls thereof.

5. A sealing strip for mounting on a flange running around a closable opening on a motor vehicle body, the flange having a predetermined variation in thickness around the periphery of the opening, the sealing strip comprising
a channel-shaped gripping part for embracingly gripping the flange and a resiliently soft sealing part mounted externally on the gripping part so as to be supported thereby around the periphery of the opening and thereby to be sealingly contacted by the closure member for the opening,
the channel of the gripping part having, prior to fitment to the flange, a width which varies along the length of the sealing strip in such predetermined manner as to match the predetermined variation in thickness of the flange.

6. A strip according to claim 5, in which the gripping part comprises a channel-shaped metal carrier embedded in extruded plastics or rubber material.

7. A strip according to claim 6, in which the extruded plastics or rubber material defines at least one gripping lip running along the length of the gripping part and mounted internally of the channel on one of the facing side walls thereof.

8. A strip according to claim 7, in which there is at least one relatively large lip on one facing side wall of the channel and a greater number of smaller lips on the opposite side wall.

9. The strip according to claim 1, in which the variation of the width of the channel is obtained by bending the side walls thereof relative to each other.

* * * * *